United States Patent [19]

Ushida

[11] Patent Number: 4,596,444
[45] Date of Patent: Jun. 24, 1986

[54] DOUBLE CANTILEVER SUPPORT CONSTRUCTION FOR OPTICAL SYSTEMS

[75] Inventor: Takashi Ushida, Yokohama, Japan

[73] Assignee: Alps Electric Co., Ltd., Japan

[21] Appl. No.: 627,874

[22] Filed: Jul. 5, 1984

[30] Foreign Application Priority Data

| Jul. 5, 1983 | [JP] | Japan | 58-122024 |
| Jul. 5, 1983 | [JP] | Japan | 58-122025[U] |
| Jul. 5, 1983 | [JP] | Japan | 58-104153[U] |
| Jul. 5, 1983 | [JP] | Japan | 58-104154[U] |

[51] Int. Cl.$^4$ .......................... G02B 7/04; F16F 1/18
[52] U.S. Cl. ................................. 350/247; 267/160; 267/165; 350/255
[58] Field of Search ............... 350/255, 247; 267/158, 267/160, 163-165; 248/567, 602-607; 369/45

[56] References Cited

U.S. PATENT DOCUMENTS

| 1,893,098 | 1/1933 | Murray, Sr. et al. | 267/165 |
| 2,487,604 | 11/1949 | Short | 267/160 |
| 2,510,630 | 6/1950 | Goldsworthy | 267/163 |
| 3,390,873 | 7/1968 | Wallerstein, Jr. | 267/165 |
| 4,449,213 | 5/1984 | Noborimoto et al. | 369/45 |

FOREIGN PATENT DOCUMENTS

| 958792 | 2/1957 | Fed. Rep. of Germany | 267/158 |
| 62836 | 4/1983 | Japan | 369/45 |
| WO82/04112 | 11/1982 | PCT Int'l Appl. | 248/602 |

Primary Examiner—William H. Punter
Attorney, Agent, or Firm—Guy W. Shoup

[57] ABSTRACT

An optical system support construction such as in a compact disc player includes a first pair of leaf springs having one ends fixed, a second pair of leaf springs having one ends fixed to free ends of the first pair of leaf springs, and an optical system component such as an objective lens supported on free ends of the second pair of leaf springs. The ratio of the spring constant of the first pair of leaf springs to the spring constant of the second pair of leaf springs is inversely proportional to the square root of the length of the first pair of leaf springs to the length of the second pair of leaf springs.

4 Claims, 13 Drawing Figures

DOUBLE CANTILEVER SUPPORT CONSTRUCTION FOR OPTICAL SYSTEMS

BACKGROUND OF THE INVENTION

The present invention relates to an optical system support construction for supporting optical components such as an objective lens reliably while allowing them to be driven in small intervals in an optical pickup, for example, in a compact disc (CD) player.

[Principles of an optical pickup]

Figure 1:
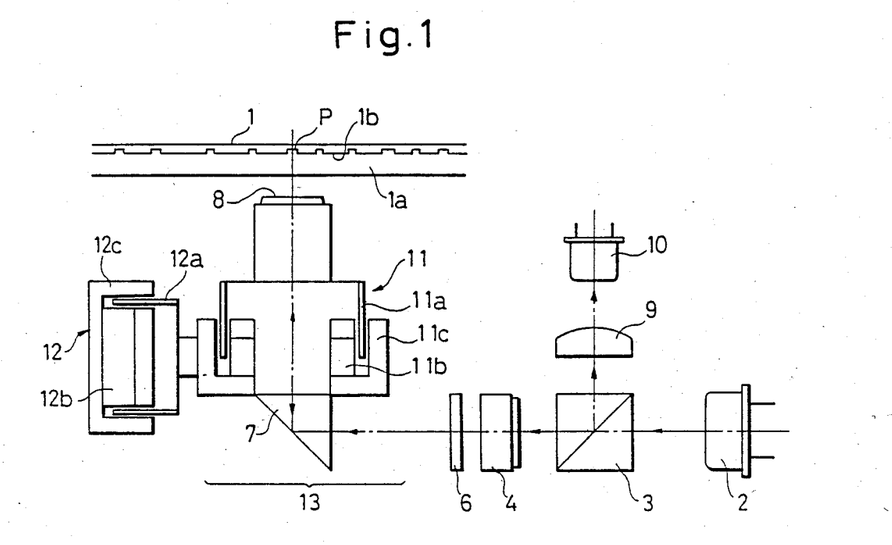
FIG. 1 is a schematic view of an arrangement of an optical pickup, the view being illustrative of the principles of operation thereof.

Optical pickups have been employed in CD players that have become available in the recent past. FIG. 1 of the accompanying drawings schematically illustrates an arrangement of such an optical pickup. A disc 1 for use in a CD player has a reflecting information-recorded surface 1b disposed inwardly of a light-transmissive layer 1a, the surface 1b having pits p by which information is digitally recorded along tracks on the surface 1b. The optical pickup includes a light source comprising a laser diode 2 for emitting a laser beam which will pass through a beam splitter 3, a collimating lens 4, and a $\frac{1}{4}$-wave plate 6, and then be reflected by a prism 7 toward an objective lens 8. The objective lens 8 forms a beam spot on the information-recorded surface 1b. A beam reflected by the surface 1b or the pits p then travels through the objective lens 8, the prism 7, and the $\frac{1}{4}$-wave plate 6 toward the beam splitter 3. Since the reflected beam has its plane of polarization turned through 90 degrees, the reflected beam is reflected at an angle of 90 degrees in the beam splitter 3 and is detected by a photodetector such as a photodiode 10 through a cylindrical lens 9. The photodiode 10 then detects the presence or absence of pits p through the intensity of the beam spot which has been modulated by the pits p.

The optical pickup also includes a focusing servomechanism 11 for focusing the laser beam on the information-recorded surface 1b and a tracking servomechanism 12 for enabling the beam spot to follow the tracks on the surface 1b. The focusing servomechanism 11 is composed of a magnetic circuit comprising a voice coil 11a coupled to the objective lens 8, a magnet 11b and a yoke 11c for driving the voice coil 11a. The tracking servomechanism 12 comprises a voice coil 12a, a magnet 12b and a yoke 12c for driving the voice coil 12a, the voice coil 12a being attached to an optical system driven unit 13 composed of the objective lens 8, the focusing servomechanism 11, and the prism 7. In the focusing servomechanism 11, a current flowing through the voice coil 11a is varied to move the objective lens 8 slightly vertically as shown in the driven unit 13. In the tracking servomechanism 12, a current flowing through the voice coil 12a is varied to move the driven unit 13 slightly horizontally as shown. Through such movements in small intervals, the beam spot can be focused on the information-recorded surface 1b and follow the tracks on the surface 1b. The objective lens 8 operating on the above principles is supported in the driven unit 13 by a support such as a leaf spring. The driven unit 13 is also supported by a support such as a leaf spring. The foregoing small movements can be produced through elastic deformation of such leaf springs.

SUMMARY OF PRIOR ART

Figures 2, 3, 4:
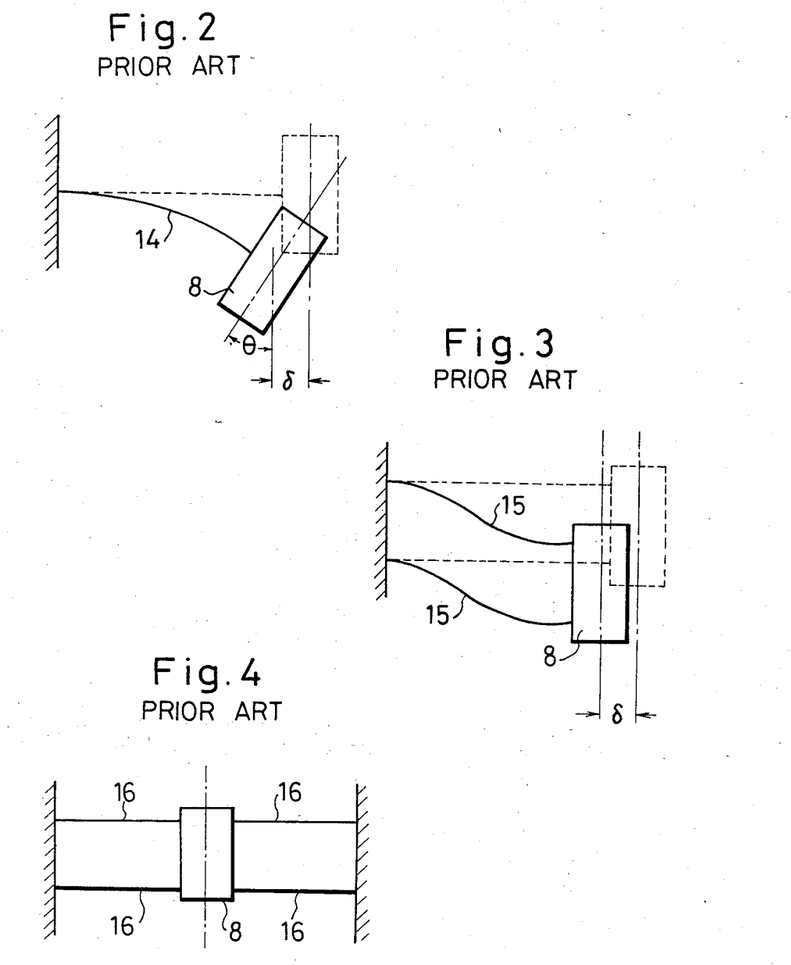
FIGS. 2, 3 and 4 are schematic diagrams showing the manner in which conventional optical system support constructions operate.

FIGS. 2 through 4 illustrate the principles of conventional support constructions, and show a mode of operation in which an objective lens 8 as a driven member is subjected to focusing servo movements. Various constructions are known in which the objective lens 8 is supported by a leaf spring or leaf springs. In FIG. 2, the objective lens 8 is supported by a single leaf spring 14 in a cantilever fasion. This support construction is disadvantageous in that when the objective lens 8 is pulled downwardly by the servomechanism, the leaf spring 14 is caused to flex a distance $\theta$ due to deformation of the leaf spring 14 and the optical axis of the objective lens 8 becomes tilted through $\theta$.

In FIG. 3, the objective lens 8 is supported by two leaf springs 15 in a cantilever fashion. Although the optical axis of the objective lens 8 will not be tilted, the leaf springs 15 will still be caused to flex the distance $\delta$. When the leaf springs 15 thus flex, the objective lens 8 is positionally displaced a distance corresponding to $\delta$, requiring a new tracking servo operation. As a result, additional unwanted servo operations are necessary and the objective lens cannot be stably servo-controlled.

FIG. 4 shows still another prior support construction in which the objective lens 8 is supported by two pairs of leaf springs 16 on both sides of the lens 8. With such a support construction, the leaf springs 16 used should be weak to allow the objective lens 8 to move vertically. Therefore, the objective lens 8 is supported less firmly, and will be subjected to unwanted movements such as in a direction perpendicular to the sheet of FIG. 4.

The tracking servomechanism for the driven unit 13 (FIG. 1) also uses a support construction employing a leaf spring or leaf springs. Such a support construction however suffers from the same problems as described above.

SUMMARY OF THE INVENTION

With the foregoing prior problems in view, it is an object of the present invention to provide an optical system support construction whih is simple and capable of reliably supporting optical system components while eliminating any unwanted tilting of the components and keeping optical axis displacements to a minimum.

Another object of the present invention is to provide an optical system support construction which is simple and capable of supporting optical system components while eliminating any unwanted tilting of the components and allowing them to be reliably moved in a direction along the optical axis.

According to the present invention, there is provided an optical system support construction comprising a first pair of leaf springs having one ends fixed, a second pair of leaf springs having one ends fixed to free ends of the first pair of leaf springs, and an optical system component supported on free ends of the second pair of leaf springs. The ratio of the spring constant of the first pair of leaf springs to the spring constant of the second pair of leaf springs is inversely proportional to the square root of the length of the first pair of leaf springs to the length of the second pair of leaf springs.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 5:
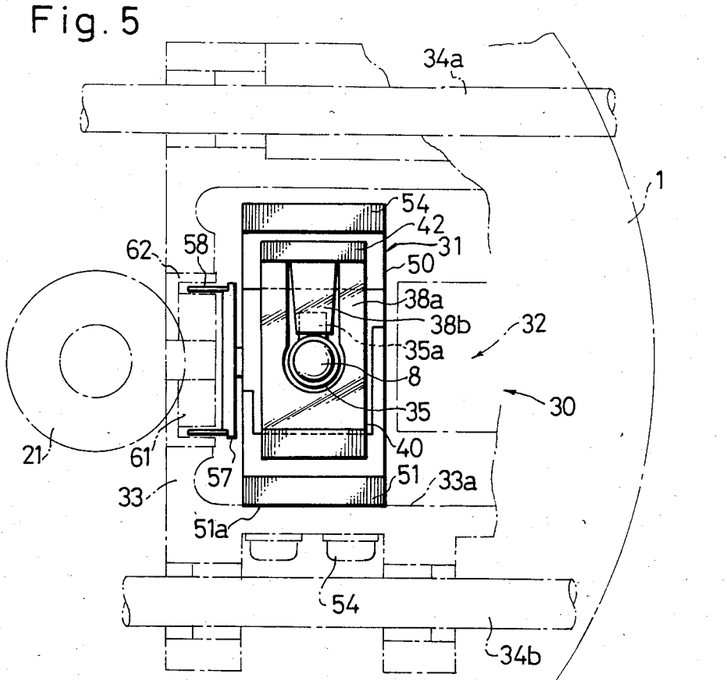
FIG. 5 is a plan view of an optical pickup in a compact disc player, the view illustrating an actuator having an optical system support construction according to an embodiment of the present invention.

As shown in FIG. 5, a compact disc (CD) player includes a turntable 21 for clamping a central portion of a compact disc 1, the turntable 21 being motor-driven for rotating the compact disc 1. The CD player also has an optical pickup 30 for reading pit information on the surface 1b (FIG. 1) in the compact disc 1. The optical pickup 30 comprises an actuator 31 for driving an objective lens 8 under servo control, and an optical detector 32, the actuator 31 and the optical detector 32 being mounted on a slider 33. The optical detector 32 is composed of the same parts as shown in FIG. 1, such as the laser diode 2, the beam splitter 3, the collimating lens 4, the ¼-wave plate 6, the cylindrical lens 9, and the photodiode 10. The slider 33 is guided for movement by two parallel guide shafts 34a, 34b, one of which comprises a screw shaft. In response to rotation of the screw shaft, the slider 33 is moved horizontally in FIG. 5 (to the right when reading information from the compact disc) in a direction radially across the tracks on the surface 1b of the compact disc 1. This movement of the slider 33 may be termed "rough feeding".

The actuator 31 which employs an optical system support construction according to an embodiment of the present invention will be described with reference to FIGS. 5 through 8.

The objective lens 8 (which is the same as the objective lens 8 in FIG. 1) disposed in confronting relation to the compact disc 1 is supported in a lens barrel 35 having a lower end flange 36 with a voice coil 37 fixed to a lower surface thereof. The lens barrel 35 is supported by a leaf spring 38 formed by pressing a single spring material into a channel shape. The leaf spring 38 includes an upper arm separated into an upper long member 38a and an upper short member 38b and a lower arm separated into a lower long member 38c and a lower short member 38d. The lens barrel 35 has a support block 35a on a side thereof, with free ends of the upper and lower short members 38b, 38d being fastended as by screws to upper and lower surfaces of the support block 35a. A reinforcement member 39 is interposed between distal ends (on the lefthand ends in FIG. 7) of the upper and lower long members 38a, 38c of the leaf spring 38, and is fastened as by screws to a fixing surface 40a of an intermediate base 40. Accordingly, the distal end of the lower long member 38a is sandwiched between the fixed reinforcement member 49 and the fixing surface 40a. A holder plate 41 is placed on an upper surface of the distal end of the upper long member 38a. The holder plate 41 and the distal end of the upper long member 38a are firmly secured to the fixed reinforcement member 39. Another reinforcement member 42 is placed in the free bent end of the leaf spring 38. Upper and lower holder plates 43, 44 are placed on upper and lower surfaces, respectively, of the free end of the leaf spring 38, and are fastened as by screws to the reinforcement member 42 through the upper and lower arms of the leaf spring 38, thus stiffening the free end of the leaf spring 38. The reinforcement members 39, 42 are formed of a rigid material such as aluminum.

Figure 6:
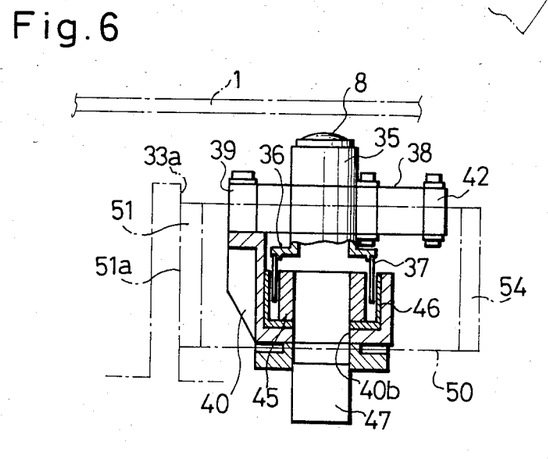
FIG. 6 is a side elevational view of the optical pickup shown in FIG. 5.
Figure 7:
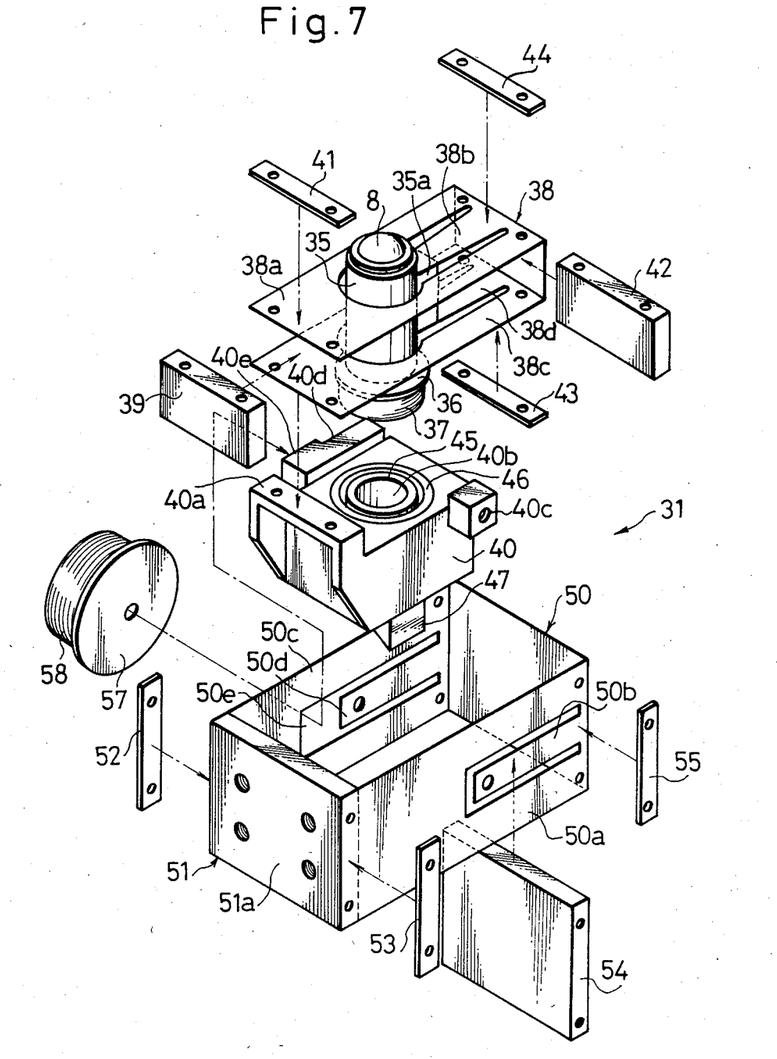
FIG. 7 is an exploded perspective view of the actuator shown in FIG. 6.

The intermediate base 40 has a central beam passage hole 40b defined vertically therethrough. The beam passage hole 40b is surrounded by a magnetic circuit composed of a magnet 45 and a yoke 46. With the leaf spring 38 fixed to the fixing surface 40a, the voice coil 37 on the lower end of the lens barrel 35 is positioned in a slit in the magnetic circuit (FIG. 6). The voice coil 37, the magnet 45, and the yoke 46 jointly constitute a focusing servomechanism. A prism 47 for reflecting a laser beam is fixed directly below the beam passage hole 40b in the intermediate base 40.

Figure 8:
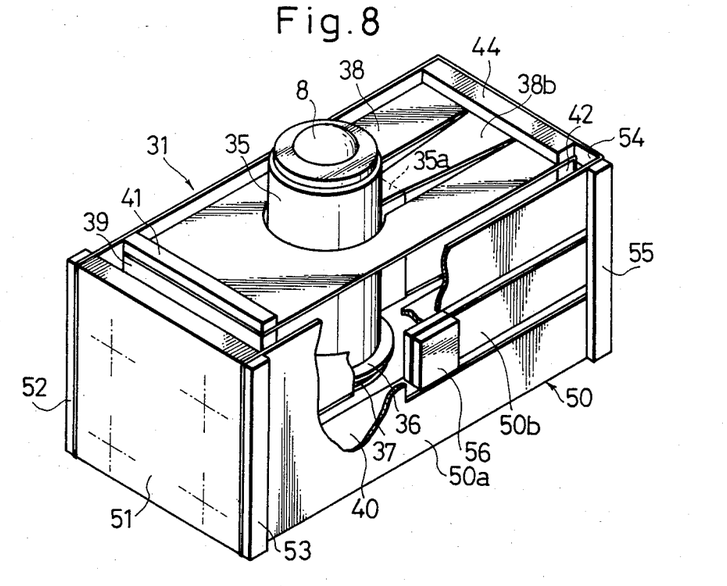
FIG. 8 is a perspective view of the actuator as assembled.

The intermediate base 40 is supported by a leaf spring 50 formed by pressing a single spring material into a channel shape. The leaf spring 50 has one arm separated into long and short members 50a, 50b and an opposite arm separated into long and short members 50c, 50d. The long members 50a, 50c have distal ends supported on opposite sides of a fixed block 51 and sandwiched and fastened as by screws between holder plates 52, 53 and the fixed block 51. The fixed block 51 has an attachment surface 51a held against and fixed as by four screws to a surface 33a of the slider 33 (FIGS. 5 and 6). A reinforcement member 54 is inserted in the free bent end of the leaf spring 50. A pair of holder plates 55 (only one shown) is held against the arms of the leaf spring 50 near the free bent end thereof and secured as by screws to the reinforcement member 54 through the leaf spring arms. Thus, the free end of the leaf spring 50 is stiffened by the reinforcement member 54. The fixed block 51 and the reinforcement member 54 are formed of a rigid material such as aluminum. The intermediate base 40 has support blocks 40c, 40d on opposite surfaces thereof which are fixed respectively to the free ends of the short members 50b, 50d of the leaf spring 50 by screws only or by screws through holder plates 56 as shown in FIG. 8.

A coil support block 40e is integrally formed with the support block 40d on one side of the intermediate base 40. With the intermediate base 40 fastened to the leaf spring 50, the coil support block 40e projects out of a recess 50e (FIG. 7) in the leaf spring 50. To the coil support block 40e, there is fixed a disc 57 with a voice coil 58 secured thereto. As illustrated in FIG. 5, the slider 33 has a magnetic circuit compased of a magnet 61 and a yoke 62. With the fixed block 51 of the actuator 31 fastened to the slider 33, the voice coil 58 is disposed in a slot between the magnet 61 and the yoke 62. The voice coil 58, the magnet 61, and the yoke 62 jointly constitute a tracking servomechanism.

A construction according to another embodiment of the present invention will be described with reference to FIGS. 10 and 11.

Figure 10:
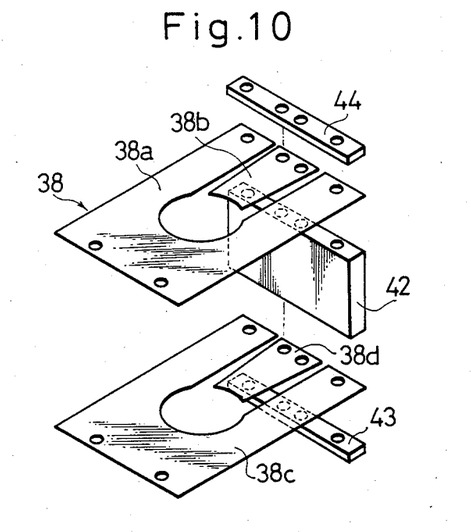
FIGS. 10 and 11 are exploded perspective views of leaf springs in a support construction according to another embodiment of the present invention.
Figure 11:
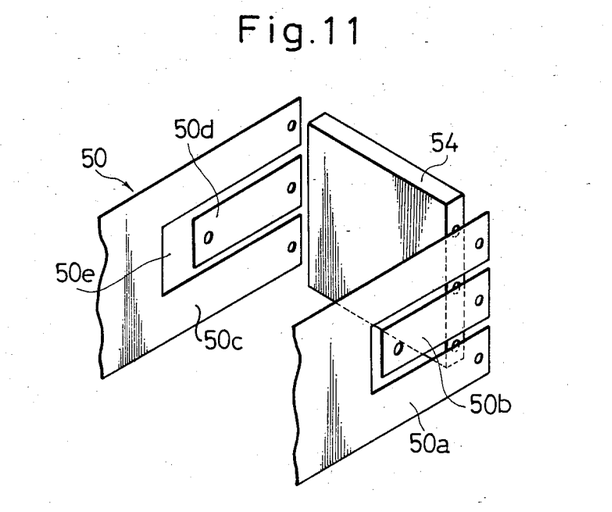

According to the embodiment shown in FIGS. 10 and 11, each of leaf springs 38, 50 is composed of divided elements. More specifically, the leaf spring 38 of the focusing servomechanism comprises an upper long member 38a, an upper short member 38b, a lower long memer 38c, and a lower short member 38d, which are separate from each other and having ends secured to upper and lower surfaces of a reinforcement member 42. The leaf spring 50 of the tracking servomechanism includes separate long members 50a, 50c and short members 50b, 50d having ends secured to a reinforcement member 54 (holder plates 55 being omitted from illustration in FIG. 11). In FIG. 10, the upper long member 38a and the upper short member 38b may be integrally formed, and the lower long member 38c and the lower short member 38d may be integrally formed. Likewise, the long member 50a and the short member 50b may be integrally formed, and the long member 50a and the short member 50b may be integrally formed in FIG. 11.

Operation of the optical system support construction according to the present invention is as follows:

The actuator 31 in the optical pickup 30 has two support constructions according to the present invention, one for supporting the lens barrel 35 on the intermediate base 40, and one for supporting the intermediate base 40 on the slider 33 (FIG. 5).

Figure 9:
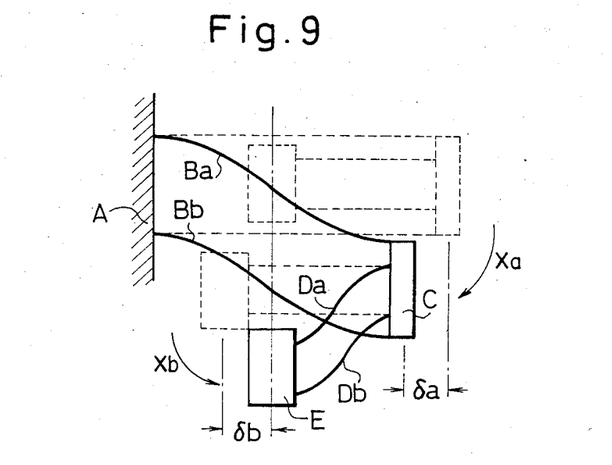
FIG. 9 is a schematic diagram showing the princple of supporting operation utilizing leaf spring deformations.

The principles of each of such support constructions are illustrated in FIG. 9. Two leaf springs Ba, Bb extend in a cantilever fashion from a fixed member A, and two leaf springs Da, Db also project from a free end of the leaf springs Ba, Bb, with an optical system component E supported on a free end of the leaf springs Da, Db. When the optical system component E is moved downwardly as shown, the leaf springs Ba, Bb, Da, Db are deformed as illustrated. At this time, the free end of the leaf springs Ba, Bb is caused to flex a distance δa to the left due to deformation of the leaf springs Ba, Bb. The optical system component E is also caused to flex a distance δb to the right due to deformation of the leaf springs Da, Db. Therefore, the combination of the leaf springs cancels out the flexing distances δa, δb in the opposite directions, so that the optical system component E will remain substantially on the same axis as that on which it was positioned before being moved. Since the leaf springs Ba, Bb and Da, Db are provided in pairs, the axis of the optical system component E is not tilted.

The principles illustrated in FIG. 9 are applied to the embodiments of the present invention. In the support construction supporting the objective lens 8, the fixed member A corresponds to the reinforcement member 39, the free end C to the reinforcement member 42, the optical system component E to the lens barrel 35, the leaf spring Ba to the upper long member 38a, the leaf spring Bb to the lower long member 38c, the leaf spring Da to the upper short member 38b, and the leaf spring Db to the lower short member 38d.

In the support construction supporting the intermediate base 40, the fixed member A corresponds to the slider 33 and the fixed block 51, the free end C to the reinforcement member 54, the optical system component E to the intermediate base 40, the leaf springs Ba, Bb to the long members 50a, 50c of the leaf spring 50, and the leaf springs Da, Db to the short members 50b, 50d.

Figure 12:
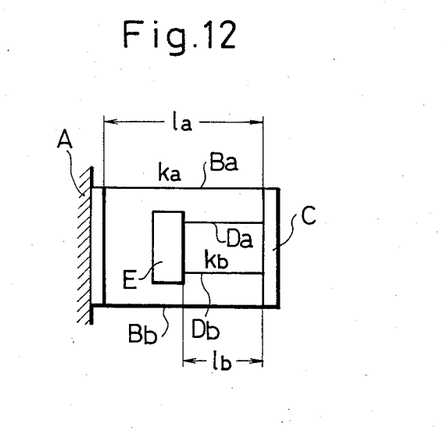
FIGS. 12 and 13 are diagrams utilized for the calculation of flexing of two sets of leaf springs.
Figure 13:
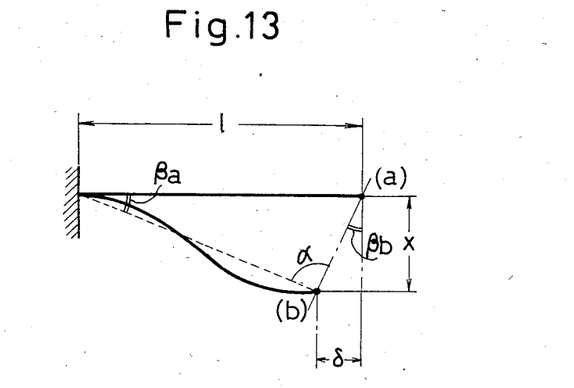

According to the operation principles shown in FIG. 9, the flexing distances δa, δb in the opposite directions are cancelled out by each other due to combined deformation of the two sets of the leaf springs. If the flexing distances δa, δb are equal to each other, then the optical system component E will alway move vertically on the same axis. The condition for ensuring such movement of the optical system component will now be determined. FIGS. 12 and 13 are explanatory of determination of such condition. FIG. 13 schematically shows the manner in which a cantilevered leaf spring is elastically deformed. The leaf spring has a free end positioned at a point (a) before it is deformed, and positioned at a point (b) after it has been deformed. Assuming that the free end of the leaf spring is caused to flex a vertical distance x after it has been deformed, an illustrated angle $\alpha$ remains about 90 degrees in a range in which the distance x is small.

$$\alpha \approx 90°$$

Therefore, in such a range, illustrated angles $\beta a$ and $\beta b$ are substantially equal to each other.

$$\beta a \approx \beta b$$

Since $$\tan \beta a \approx x/(l-\delta) \text{ and}$$

$$\tan \beta b = \delta/x,$$

$$x/(l-\delta) \approx \delta/x, \text{ and}$$

$$x^2 = \delta(l-\delta).$$

As $\delta$ is sufficiently smaller than l, $$x^2 \approx \delta l,$$

and hence $$\delta \approx x^2/l \quad (1)$$

It is assumed as shown in FIG. 12 that the first set of leaf springs Ba, Bb of the support construction of the invention has a spring constant ka and a length la, moves vertically a flexing distance xa in FIG. 9, and is positionally displaced a distance δa (FIG. 9) in a direction normal to the distance xa, and the second set of leaf springs Da, Db has a spring constant kb and a length lb, moves vertically a flexing distance xb, and is positionally displaced a distance δb in a direction normal to the distance xb. From the equation (1), $$\delta a = [xa]^2/la, \delta b \approx [xb]^2/lb.$$

It is necessary to meet the following equation:

$$xa/xb = \sqrt{la/lb}$$

in order to satisy the condition δa=δb that has to be reached. Since the loads imposed on the sets of the springs are the same, $$xa \times ka = xb \times kb,$$

$$x_a/x_b = k_b/k_a.$$

Therefore, $$k_b/k_a \approx \sqrt{l_a/l_b} \qquad (2)$$

By combining leaf springs that satisfy the equation (2), that is, by selecting the ratio of the spring constant of the first set of leaf springs to the spring constant of the second set of leaf springs so as to be inversely proportional to the square root of the ratio of the length of the first set of leaf springs to the length of the second set of leaf springs, the horizontal flexing distances $\delta_a$, $\delta_b$ due to deformation of the sets of leaf springs can be cancelled out, and hence the optical system component E in FIG. 9 will move vertically on substantially the same axis.

In the focusing servomechanism according to the embodiment of the invention, the objective lens 8 will move upwardly and downwardly on the same axis by selecting the spring constants and lengths of the long members 38a, 38b and short members 38b, 38d of the leaf spring 38 to meet the equation (2). In the tracking servomechanism according to the embodiment of the invention, the intermediate base 40 will move on the same axis by selecting the spring constants and lengths of the long members 50a, 50b and short members 50b, 50d of the leaf spring 50 to meet the equation (2).

Information reading operation of the optical pickup 30 will now be described.

The compact disc 1 is clamped on the turntable 21 and driven to rotate by the motor. The screw shaft, which may be either the guide shaft 34a or 34b (FIG. 5) is driven by a motor (not shown) to rotate about its own axis to move the slider 33 to the right (FIG. 5). Information recorded along the spiral tracks in the compact disc 1 is read by the objective lens 8. The beam spot can be focused on the information-recorded surface 1b (FIG. 1) in the compact disc 1 by varying a current flowing through the voice coil 37 on the lower end of the lens barrel 35. By thus varying the voice coil current, the voice coil 37 disposed between the magnet 45 and the yoke 46 is moved vertically in FIG. 6. At this time, the leaf spring 38 operates on the same principles as those shown in FIG. 9 with the reinforcement member 39 serving as the fixed end and the reinforcement mmeber 42 as the free end, thereby allowing the objective lens 8 and the prism 47 which reflects the beam to the objective lens 8 to move vertically on substantially the same axis. The beam spot can be servo-controlled to follow the tracks in the compact disc 1 by varying a current flowing through the voice coil 58 attached to the intermediate base 40. By thus varying the voice coil current, the voice coil 58 disposed between the magnet 61 and the yoke 62 is driven horizontally (FIG. 5). At this time, the leaf spring 50 operates horizontally on the same principles as those shown in FIG. 9 with the fixed block 51 serving as the fixed end and the reinforcement mmeber 54 as the free end, thereby allowing the objective lens 8 to move on substantially the same axis. The prism 47 attached to the lower end of the lens barrel 35 is directed toward the optical detector 32 and moves horizontally (FIG. 5) on the same axis with the objective lens 8, so that the prism 47 will alway remain on the optical axis to thereby send and receive the laser beam accurately to and from the optical detector.

The leaf springs in the support construction according to the present invention are not limited to the illustrated configurations, but may be of desired shapes as far as the principles of FIG. 9 are applicable.

The present invention offers the following advantages:

(1) Since two different leaf springs are mounted on the free end of two cantilevered leaf springs and an optical system component is supported on the former leaf springs, any flexing distances caused due to deformation of these sets of leaf springs can be cancelled out when the optical system component is driven, and the optical system component is displaced a miminum distance from the axis along which the component is moved. This results in no optical axis deviation of the optical system component, and various adjustment operations can accurately be made for the optical system.

(2) The optical system component supported by the sets of two leaf springs will operate without allowing its axis to be tilted, and no optical defficiency such as tilting of the optical axis is caused.

(3) With the optical system support construction according to the present invention, the focusing servomechanism and tracking servomechanism in the optical pickup can be of an integral structure, so that the optical pickup can be smaller in size.

(4) Since a reinforcement member is mounted on the free end of the first set of leaf springs and the second set of leaf springs is supported on such free end, the free end is less subjected to being twisted at the time the first set of leaf springs is deformed, and hence rectilinear movement of the optical system component due to deformation of the first set of leaf springs can be maintained with high accuracy. The second set of leaf springs is firmly supported on the first set of leaf springs, and can support the optical system component stably.

(5) As the first and second sets of leaf springs are bent from a single spring material, they can easily be manufactured at a low cost. Since the support is constructed of the leaf springs only, the movable portion is light in weight, operates quickly, and thus is highly responsive to the servomechanisms.

(6) By selecting the ratio of the spring constant of the first set of leaf springs to the spring constant of the second set of leaf springs so as to be inversely proportional to the square root of the ratio of the length of the first set of leaf springs to the length of the second set of leaf springs, the distances that the two sets of leaf springs flex can completely be cancelled out by each other, so that the optical system component will move reliably on the same axis.

Although certain preferred embodiments have been shown and described, it should be understood that many changes and modifications may be made therein without departing from the scope of the appended claims.

What is claimed is:

1. An optical system support construction comprising a first pair of leaf springs having one ends fixed, a second pair of leaf springs having one ends fixed to free ends of said first pair of leaf springs, and an optical system component supported on free ends of said second pair of leaf springs, the arrangement being such that the ratio of the spring constant of said first pair of leaf springs to the spring constant of said second pair of leaf springs is inversely proportional to the square root of the length of said first pair of leaf springs to the length of said second pair of leaf springs.

2. A double cantilever optical system support construction comprising a first pair of leaf springs, which are planar and spaced apart in parallel, said pair having one ends thereof fixed, and the other ends thereof being free ends each having a recess extending toward a respective fixed end and being defined between a pair of coplanar long leg portions, a reinforcement member mounted to the two pairs of long leg portions so as to form an integral structure at said free ends of said first pair of leaf springs, a second pair of leaf springs each being a short leg portion positioned coplanar in a respective recess of said free ends of said first pair of leaf springs, said second pair of leaf springs having one ends fixed to said integral structure and the other ends being free ends extending toward the fixed ends of said first pair of leaf springs, and an optical system component supported on said free ends of said second pair of leaf springs for stable rectilinear movement along a first axis.

3. A double cantilever optical system support construction as described in claim 2, wherein said first and second pair of leaf springs are formed from a single spring member which is bent at right angles to form said free ends of said first pair of leaf springs combined with said fixed ends of said second pair of leaf springs.

4. A double cantilever optical system support construction as described in claim 2, further comprising a second double cantilever support construction enclosing the first described double cantilever support construction, the second support construction having a similar arrangement of a first pair of leaf springs having fixed ends and free ends, a reinforcement member forming an integral structure at the free ends of said first pair of leaf srings, and a second pair of leaf springs having fixed ends mounted to said integral structure, wherein said fixed ends of said first pair of leaf springs of the first support construction are mounted to a mounting structure which is supported on the free ends of said second pair of leaf springs of the second support construction for stable rectilinear movement along a second axis transverse to said first axis.

* * * * *